Nov. 9, 1943.    A. F. HICKMAN    2,333,650
TANDEM AXLE SUSPENSION
Filed Feb. 26, 1942    5 Sheets-Sheet 1

INVENTOR
Albert F. Hickman
BY
Popp and Popp
ATTORNEYS

Nov. 9, 1943.  A. F. HICKMAN  2,333,650
TANDEM AXLE SUSPENSION
Filed Feb. 26, 1942  5 Sheets-Sheet 2

INVENTOR
Albert F. Hickman
BY
Popp and Popp
ATTORNEYS

Nov. 9, 1943.  A. F. HICKMAN  2,333,650

TANDEM AXLE SUSPENSION

Filed Feb. 26, 1942  5 Sheets-Sheet 4

INVENTOR
Albert F. Hickman
BY
Popp and Popp
ATTORNEYS

Patented Nov. 9, 1943

2,333,650

UNITED STATES PATENT OFFICE 2,333,650

TANDEM AXLE SUSPENSION

Albert F. Hickman, Eden, N. Y., assignor to Hickman Pneumatic Seat Co., Inc., Eden, N. Y., a corporation of New York Application February 26, 1942, Serial No. 432,404

19 Claims. (Cl. 280—104)

This invention relates to a spring suspension for vehicles and more particularly to a spring suspension for multiple axles in which each axle is permitted to move against a geometric resilient resistance both laterally and longitudinally, relative to the vehicle frame, both when the vehicle has a low percentage of load variation and also when it has a high percentage of load variation. The invention also relates to a mechanical movement for transmitting otherwise identical opposite rotary movement from one shaft to another, this mechanical movement being employed in the tandem or multiple axle suspension to obtain the desired axle compensation, that is, a transfer of the load between the companion ends of each pair of axles. While the invention is more particularly described in connection with a highway vehicle, it is also applicable for use on other land vehicles, such as railroad cars.

This application is a continuation in part of my copending application Ser. No. 319,097, filed February 15, 1940, Patent No. 2,290,181, July 21, 1942, for Tandem axle suspension.

One of the objects of the invention is to reduce and cushion the lateral impacts from the axles against either the frame or the springs of a vehicle which is subject to either a high or a low percentage of load variation.

Another object is to provide a tandem axle spring suspension in which one or both of the tandem axles are self-steering so that, when rounding a curve, said tandem axles are caused to assume such an angle relative to each other as will enable a pure rolling action to be obtained and thereby reduce tire scuff and increase tire and gasoline mileage.

Another object is to accomplish the above objects regardless of whether the vehicle is loaded or unloaded and without imposing undue end thrusts on the various pivotal connections which connect the axles to the frame.

Another object is to provide such a tandem axle spring suspension in which movements of either one or both of the axles are, at the same time, opposed by a geometric resilient resistance and in which either one or both of said axles are opposed by a total resilient force of such nature as to take care of a high percentage of load variation.

Another object is to provide such a tandem axle spring suspension in which geometric resilient resistance is obtained in a compact structure which requires no lubrication.

Another object of the invention is to provide such a tandem axle spring suspension which includes a compensating means connecting the companion ends of the tandem axles and through which the excess load on either axle is transmitted to the other axle.

Another object of the invention is to provide such axle compensating means which include a torsion rod for resiliently connecting each axle with the frame and a means for connecting the normally "dead" ends of the two torsion rods so that the excess stress on one torsion rod is transmitted to the other thereby to transmit the load from one axle to the other.

Another object of the invention is to provide such a tandem axle spring suspension in which the torsion rods are of sufficient length to provide the desired resilient support for the frame and in which the compensating means for connecting the two torsion rods at the companion ends of the tandem axles comprises a simple transmission which is not liable to get out of order or require frequent servicing.

Another object of the invention is to provide such a transmission which can be in the form of a pair of identical gears so that otherwise identical opposite rotary movement is transmitted from one torsion rod to the other.

Another object of the invention is to provide a novel mechanical movement in the form of a pair of crank arms and a connecting link for so transmitting otherwise identical opposite rotary movement from one torsion rod to the other.

Another object of the invention is to provide a tandem axle spring suspension in which the torsion rods, in addition to serving as the spring means between the axles and the frame, also serve as journal pins for pivotally connecting the axles to the frame.

Another object of the invention is to provide a tandem axle suspension in which the transfer of the load from the tandem axles to the front axle of the vehicle, under braking reaction, is identical with the similar transfer of the load in a two axle vehicle of the same wheel base, weight and load.

Another object of the invention is to provide such a tandem axle suspension in which the distribution of the load from the tandem axles to the frame is at a plurality of points, this distribution of load being to eight points in the vehicle shown.

Another object of the invention is to avoid all leaf spring friction by the use of torsion rods and a linkage connection between the frame and the tandem axles. With heavy vehicles supported on leaf springs, the left spring friction is extremely high when the vehicle is unloaded so as to render the vehicle practically unsprung.

Another object of the invention is to very materially reduce the weight of the tandem axle suspension as compared with conventional leaf spring tandem axle suspensions now in use. This is accomplished by substituting small levers and light torsion rods for the conventional leaf springs and by the elimination of cross shaft stabilizers.

Numerous other objects of the invention and practical solutions thereof are disclosed in detail in the following description and drawings, in which:

The invention is shown in connection with a highway vehicle, although the invention is also applicable to railroad cars or other land vehicles. The frame 20 of the vehicle is shown as including a pair of longitudinal side frame bars 21 suitably joined together transversely by cross frame bars 22 in the usual and well known manner. Frequently, in modern practice, the imposed loads are transmitted directly from the vehicle spring suspension to the body in which case the "frame" is little more than a template.

This frame is shown as supported by a pair of tandem axles 25 and 26 which are supported by wheels 27, these wheels being rotatably secured to the axles. One or both pair of wheels can be drive wheels, the front axle 25 being shown as provided for this purpose with a differential housing 28 through which power is transmitted to the drive axle shafts 29 housed within the front axle 25 and which are secured to the wheels of the front axle 25 in the usual and well known manner.

Each end of the front axle 25 is resiliently connected to the frame through a torsion rod 30 and each end of the rear axle 26 is resiliently connected to the frame through a torsion rod 30a, these torsion rods being identical except that the torsion rod 30 is shorter than the torsion rod 30a. The means for pivotally connecting each end of each axle with the frame 20 and with the companion torsion rod 30 or 30a are identical in construction and hence the following description will be deemed to apply to all four of these pivotal connecting means.

Figure 9:
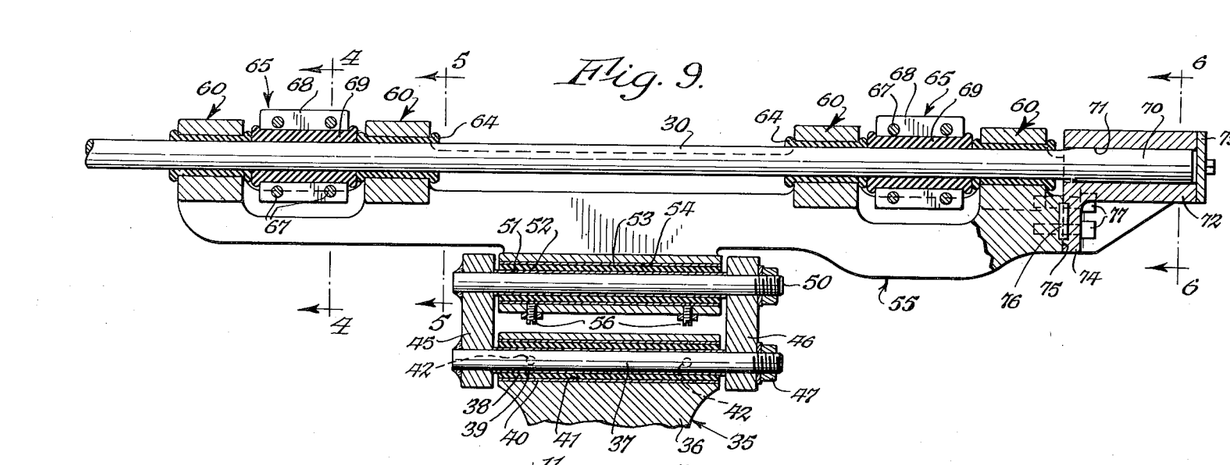
Fig. 9 is a laid-out section through the linkage pivotally connecting each end of each axle with the frame, this section being taken generally on line 9—9, Fig. 3.

To each end of each axle is secured an axle bracket 35 which is fast to the axle and extends upwardly therefrom and is formed to provide an inwardly projecting arm or horn 36 at its upper end. At its inner upper extremity this axle bracket 35 pivotally carries an axle pivot pin 37 which, as best shown in Fig. 9, is preferably mounted in a rubber sleeve 38 having a tubular metal lining sleeve 39 which is tightly fitted around the axle pivot pin 37 and having a tubular metal outer sleeve 40 which is fitted in a bore 41 in the upper inner extremity of the axle bracket 35, this outer sleeve 40 being held against rotation in the bore 41 by set screws 42 or in any other suitable manner. The rubber connection between each axle bracket 35 and its axle pivot pin 37 permits the axle pivot pin 37 to oscillate in the axle bracket 35 the necessary extent to permit vertical and lateral movement of each axle relative to the frame 20 as hereinafter described and avoids the necessity of providing a bearing which requires lubrication or which may become noisy.

Figure 1:
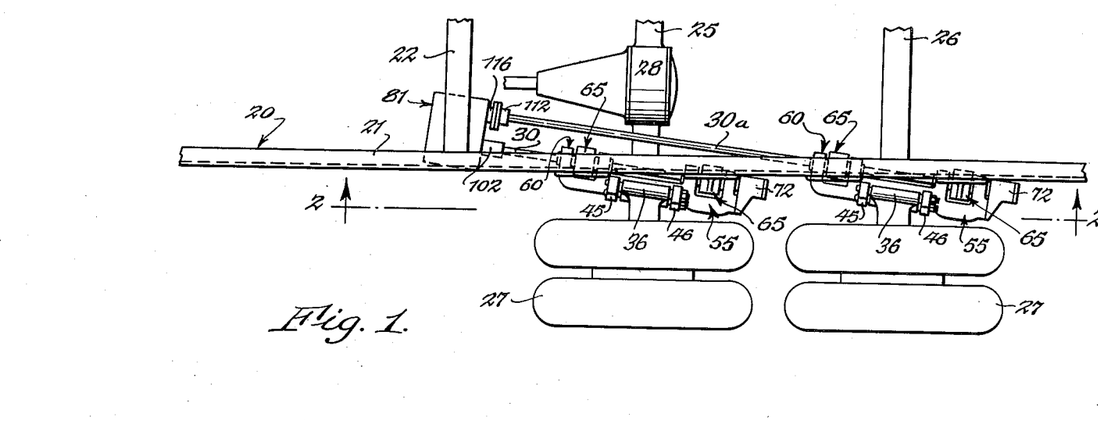
Fig. 1 is a fragmentary top plan view of a tandem axle spring suspension embodying my invention.
Figure 2:
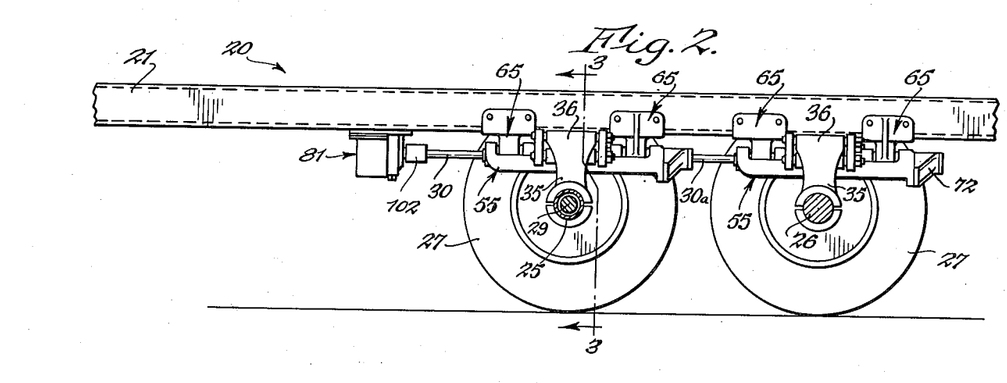
Fig. 2 is a vertical longitudinal section thereof, taken on line 2—2, Fig. 1.

Referring to Fig. 1, it will be noted that the axle pivot pins 37 slant forwardly and inwardly relative to the longitudinal axis of the frame 20, or, in other words, the axle pivot pins 37 for each axle "toe in." This arrangement of these axle pivot pins 37, together with the corresponding arrangement of the other pivotal connections, as hereinafter described, renders the axles self-steering in rounding curves.

As best shown in Fig. 9, the inner metal lining sleeve 39 of the rubber bushing for the axle pivot pin 37 is extended outwardly beyond the front and rear extremities of the axle bracket 35 and forms a spacer for a pair of shackles 45 and 46. The shackle 45 is welded to the corresponding end of the axle pivot pin 37 and one end of the shackle 46 is secured to the opposite threaded end of the axle pivot pin 37 by means of a nut 47.

The other ends of the shackles 45 and 46 are similarly secured to the opposite ends of a crank arm pivot pin 50, this crank arm pivot pin 50 being tightly fitted in the inner lining sleeve 51 of a rubber bushing or sleeve 52 with this inner metal lining sleeve 51 forming a spacer for the two shackles 45 and 46. The rubber sleeve 52 is surrounded by an outer metal sleeve 53 which is secured in the bore 54 at the outer end of a crank arm 55 by means of set screws 56. This crank arm 55 is rotatably mounted on the corresponding torsion rod 30 or 30a which is in turn journaled in bearings secured to the main frame 20 of the vehicle, the torsion rods 30, 30a thereby serving both as the springing means for the suspension and also as the journal pins for the crank arms 55.

Figures 3, 4, 5, 6, 7, 8:
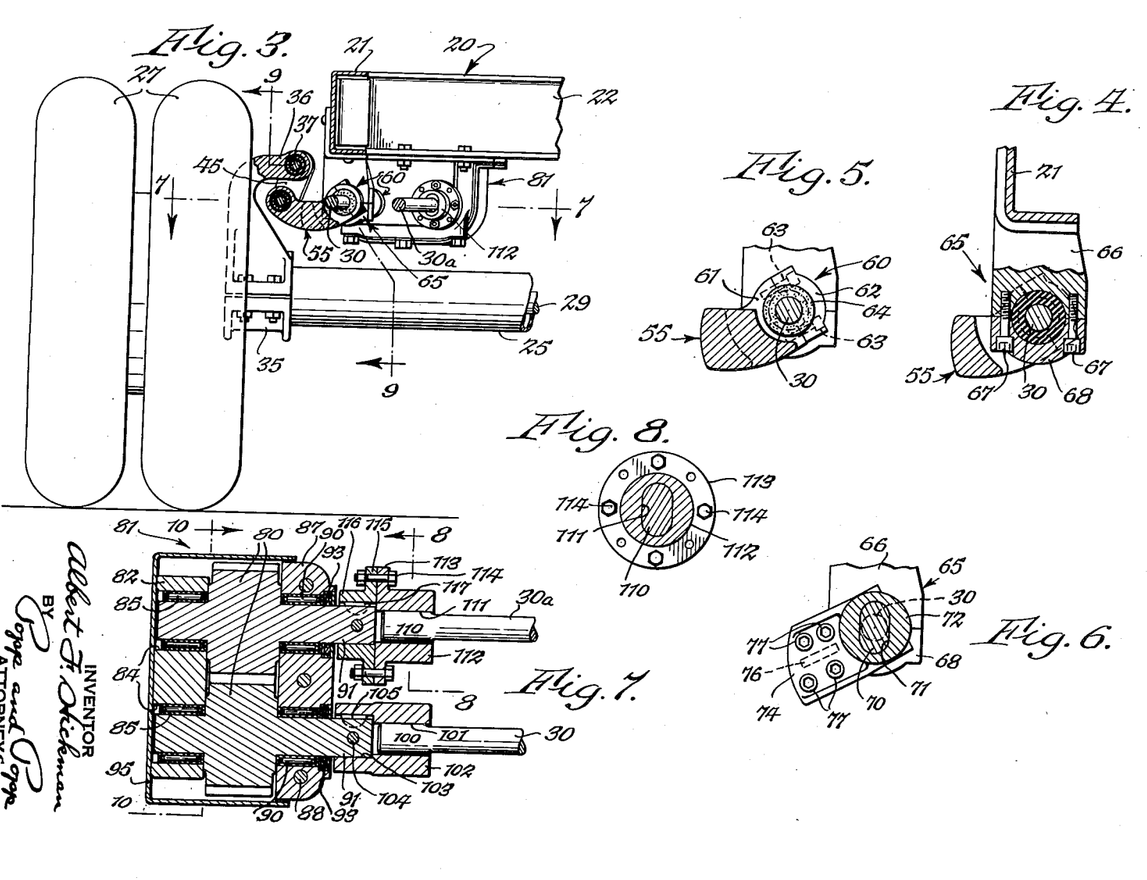
Fig. 3 is an enlarged fragmentary transverse section thereof, taken generally on line 3—3, Fig. 2.
Figs. 4, 5 and 6 are fragmentary vertical transverse sections, taken on the correspondingly numbered lines of Fig. 9.
Fig. 7 is a fragmentary horizontal section, taken on line 7—7, Fig. 3.
Fig. 8 is a fragmentary vertical transverse section, taken on line 8—8, Fig. 7.

For this purpose each crank arm 55 is extended a substantial extent lengthwise of the vehicle and each crank arm is provided at its front and at its rear end with a pair of spaced bearings 60 which embrace the corresponding parts of the companion torsion rod 30 or 30a. Each of these bearings 60 is shown, as best illustrated in Figs. 5 and 9, as comprising a half bearing 61 formed in the crank arm 55 and a half bearing cap 62 secured to the half bearing 61 by screws 63 and embracing a rubber bushing 64 which is tightly compressed against the corresponding torsion rod 30 or 30a. The use of the rubber bushing 64 permits the necessary swinging movement of the crank arm 55 about its torsion rod as an axis and at the same time avoids the necessity for lubrication and the liability of squeaks.

Between the front pair of bearings 60 of each crank arm 55 and between its rear pair of bearings 60, the torsion rod 30 or 30a is secured to the frame 20 of the vehicle by a bearing indicated generally at 65. As best shown in Fig. 4, each of these bearings comprises a bracket 66 which is secured to the corresponding longitudinal side bar 21 of the frame 20 and formed on its underside to provide a half bearing. To the underside of each bracket 66, by means of screws 67 or in any other suitable manner, is secured a half bearing cap 68 which compresses a rubber bushing 69 into firm engagement with the corresponding part of the torsion rod 30 or 30a, the torsion rods being thereby permitted to oscillate in the bearings 65.

The axis of each torsion rod 30, 30a is parallel with the axis of its companion crank arm pivot pin 50 and axle pivot pin 37, these parts thereby all "toeing in" to secure self-steering of the individual axles as hereinafter described. The rear extremity of each torsion rod 30 or 30a is positively connected to the rear extremity of its companion crank arm 55 so that the oscillating movement of each crank arm 55 is transmitted directly to the rear or "live" end of its torsion rod 30 and 30a.

For this purpose the rear or live end 70 of each torsion rod 30 or 30a is preferably ovalled in the manner set forth in my Patent No. 2,213,004, granted August 27, 1940, for a Torsion rod mounting. This ovalled rear end of each torsion rod is fitted in a correspondingly shaped bore 71 provided in a socket member 72, the rear end of this bore being preferably closed by a removable cap 73. As best shown in Figs. 6 and 9 the socket member 72 is provided with a laterally extending arm 74 which is fitted against the flat end face 75 of the corresponding crank arm 55. A radially extending key 76 is preferably inserted in keyways provided in these parts and the arm 74 of each socket 72 is secured to the end of the corresponding crank arm 55 by a plurality of screws 77 or in any other suitable manner. It will therefore be seen that each socket member 72 is fast to the rear end of the corresponding crank arm 55 and that therefore the oscillation of each crank arm 55, through its bearings 60, effects a corresponding twisting of the live end 70 of its torsion rod 30 or 30a, this twisting movement of its torsion rod being permitted by the bearings 65.

To provide axle compensation, that is, the transfer of the load from one of the tandem axles to the other in order to secure a distribution of the total load between the two axles at all times, the forward or "dead" ends of each pair of torsion rods 30 and 30a are interconnected by a transmission through which the excess load of one torsion rod is caused to wind up the other torsion rod and hence transmit a part of the excess load to the other axle.

Figures 10, 11:
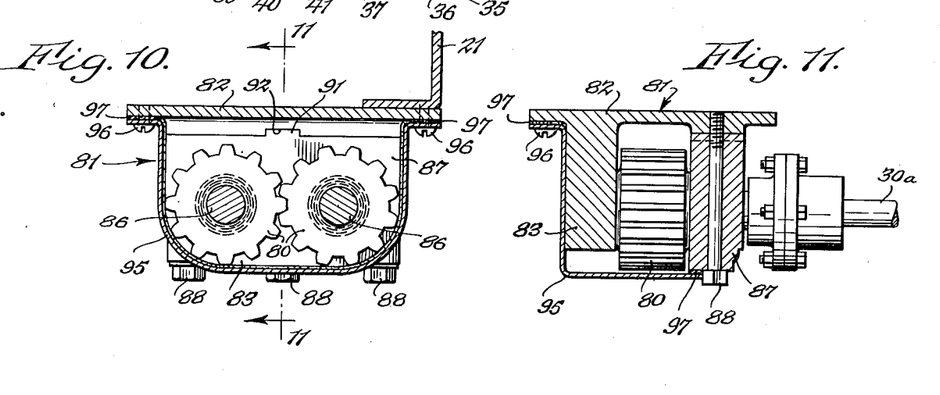
Fig. 10 is a fragmentary vertical transverse section, taken on line 10—10, Fig. 7.
Fig. 11 is a fragmentary vertical longitudinal section, taken on line 11—11, Fig. 10.

In the form of the invention shown in Figs. 1-11 this is accomplished by a pair of identical intermeshing gears which are journaled in bearings secured to the frame 20 and each of which is secured to the rear end of the corresponding torsion rod 30, 30a. The gears 80 of this compensating transmission, indicated generally at 81, are supported by a casting 82 which is secured to the underside of the corresponding side bar 21 of the vehicle frame 20. As best shown in Figs. 7 and 11, this casting is provided with an integral depending bearing block 83 having two bores 84 in each of which is fitted a cage 85 of roller bearings in which the corresponding stub shaft 86 of the corresponding gear 80 is journaled.

On the one side of the gears a removable bearing block 87 is secured to the casting 82 by means of screws 88, this bearing block also carrying a pair of roller bearing cages 90 in which the opposite stub shafts 91 of the gears 80 are journaled. The alinement of the removable bearing block 87 with the fixed bearing block 83 is shown as maintained by providing the removable bearing block with a tenon 91 which is fitted in a groove 92 in the casting 82 and oil seals 93 are shown as provided in the removable bearing block 87 around the stub shafts 91. The gears 80 are encased and provided with a body of lubricant by a sheet metal shell 95 which is provided with end, bottom and side walls and attaching flanges, the end wall of this casing 95 fitting against the fixed bearing block 83 and its bottom and side walls fitting around the bottom and sides of the removable bearing block 87. This casing 95 is secured to the casting 82 and removable bearing block 87 by means of screws 96 and suitable gaskets 97 are provided to retain a body of lubricant in which the gears run.

The end 100 of the torsion rod 30 is ovalled in the manner set forth in my Patent No. 2,213,004 and is fitted into the correspondingly ovalled bore 101 of a socket member 102, this socket member also having a bore 103 fitting the projecting end of the stub shaft 91 of the corresponding gear 80. The socket member 102 is shown as pinned to this stub shaft 91, as indicated at 104, and in addition a key 105 is shown as provided between these parts.

The end 110 of the torsion rod 30a is also preferably ovalled in the manner shown in my said Patent No. 2,213,004 and is fitted with a similarly ovalled bore 111 of a socket member 112. This socket member is shown as provided with an annular flange 113 which is shown as bolted, as indicated at 114, to the annular flange 115 of a connecting sleeve 116. This sleeve is shown as pinned to the stub shaft 91 of the other gear 80 and a key 117 is shown as interposed between these parts.

The flanges 113 and 115 of the socket member 112 and sleeve 116 are shown as provided with a relatively large number of bolt holes for the reception of the bolts 114 and these bolt holes are evenly spaced around these annular flanges. This permits of adjusting the stress placed upon the torsion rods 30 and 30a. Thus it will be noted from Fig. 8 that eight sets of bolt holes are provided for the four bolts 114 and by removing these bolts it will be seen that the socket member 112 can be turned to different angular positions with reference to the sleeve 116 and the bolts 114 replaced in this readjusted relative position of the parts. The position selected depends upon the normal stress desired in the torsion rods 30 and 30a.

In the operation of the suspension the upward movement of one end of, say, the front drive axle 25, through its shackles 45, 46, swings the outer end of its crank arm 55 upwardly, this crank arm rotating about its bearings 60 which pivotally support the crank arm on its torsion rod 30, this torsion rod being in turn supported adjacent the bearings 60 by its bearings 65 which are secured to the main frame 20 of the vehicle. These bearings 60 and 65 and the bearings for the axle pivot pin 37 and the crank arm pivot pin 50 for the shackles 45, 46 are all rubber bushed so as to permit the necessary oscillating movement of the crank arm 55 and of the live end of the torsion rod 30 and at the same time avoid the necessity for lubrication.

Since the rear end of this crank arm 55 is connected to the ovalled "live" end 70 of the torsion rod 30 by the socket member 72, it will be seen that this upward movement of the axle 25 will twist this torsion rod 30. This torque of the torsion rod 30 is transmitted through the socket member 102 to the corresponding gear 80 of the compensating transmission 81, this gear 80 being thereby rotated and rotating its companion gear 80 of this transmission. The stub shaft 91 of this second gear 80 is connected through the sleeve 116 and socket member 112 with the ovalled end 110 of the torsion rod 30a for the rear axle 26 and hence the rotating of the pair of gears 80 is transmitted to this torsion rod 30a.

This twisting of the torsion rod 30a, through the socket member 72 secured to its crank arm 55, tends to force this last crank arm 55 downwardly, this crank arm 55 being free to swing about its bearings 60 on the torsion rod 30a which in turn is supported in its bearings 65. This downward force imposed upon the crank arm 55 for the rear axle 26 is transmitted through its crank arm pivot pin 50, shackles 45, 46, axle pivot pin 37 and axle bracket 35 directly to the corresponding end of the rear axle 26.

It will therefore be seen that the torsion rods 30 and 30a having their normally "dead" ends interconnected through the transmission 81 provide axle compensation, that is, the transfer of the load from one of the tandem axles to the other, thereby to secure a distribution of the load between the tandem axles. At the same time, the torsion rods 30, 30a are selected so as to be capable of twisting to provide the necessary resilient connection between the tandem axles 25, 26 and the frame 20 of the vehicle.

It will be noted that the shackles 45, 46 are inclined upwardly and inwardly from the crank arm pivot pins 50 to the axle pivot pins 37. This upward and inward inclined arrangement of the shackles tends to cause each axle to centralize itself in a direction transverse of the frame and enables the action of gravity to geometrically and resiliently resist any such movement of either axle away from its central position. This permits the vehicle frame 20 to move substantially straight ahead despite a certain amount of lateral movement of the axle. This arrangement of the shackles further provides high and wide pivot positions which provides increased stability in that it provides effective spring centers which can be as wide or wider than the track of the vehicle. Further, this arrangement of the shackles reduces sidesway, the high and wide pivot positions, together with the upward and inward slant of the shackles, providing a suspension in which the frame 20 is more nearly suspended than mounted. Other important advantages which flow from the inclined arrangement of the shackles shown are the reduction in the possibility of wheel tramp and in the elimination of the need for anti-body roll devices, such as torsion bar stabilizers.

When the vehicle is traveling straight ahead, if the tandem axles 25, 26 are not parallel for any reason, they will automatically assume a parallel position because of the fact that if, for example, the rear axle 26 is out of line it will tend to follow a horizontal arc and this tendency, due to the lateral friction between the tires and the roadway, will cause a lateral movement of the axle relatively to the frame. Due to the fact that the shackles 45, 46 normally extend upwardly and inwardly and also due to the fact that the axes of the axle pivot pin 37, crank arm pivot pin 50 and torsion rods 30, 30a incline forwardly and inwardly or "toe in" as shown in Fig. 1, this lateral movement is automatically caused to be translated into a slight turning movement of the whole axle, and this turning movement will continue until both the tandem axles are in line with each other. Such a movement, naturally, causes a change in the angularity of the shackles 45, 46 at the opposite ends of each axle and this change is resisted by gravity which, due to the obliquity of the shackles, is caused to act in a geometric manner.

The fact that the tandem axles 25, 26 "trail" each other also occurs when the vehicle is making a turn on the road. In this case, just as when going straight ahead, the tires naturally tend to resist lateral scuffing and tend to push the axle laterally and, as a consequence, the whole axle moves obliquely to eliminate this scuffing. Thus, when the vehicle is making a turn, the tandem axles are caused to automatically move to such oblique position relative to each other as will cause their axes to intersect the axes of revolution of the two front wheels and will enable the vehicle to make the turn without tire scuffing. This action occurs when either the vehicle is steered around a long turn in the road or if it is steered sharply on a straight road as, for instance, when overtaking a slow vehicle ahead, or otherwise avoiding some obstruction. It will also be seen that this action also takes place to some extent when a tendency to tire scuffing occurs because of one wheel or a pair of wheels at one end of an axle having a diameter different from the diameter of the wheel or pair of wheels at the other end of the same axle.

It will also be seen that by arranging the axes of the torsion rods 30, 30a the crank arm pivot pins 50 and the axle pivot pins 37 to so "toe in," the torsion rods 30 and 30a are brought out of alignment with each other and into side by side relation in a horizontal plane. This permits the normally "dead" ends of these torsion rods to be interconnected by the compensating transmission 81 in the manner shown.

Figs. 12–16 are concerned with a novel mechanical movement or transmission which was developed as a substitute for the pair of gears 80, 80 in the form of the invention shown in Figs. 1–11. However, it has a much wider field of use and can be used wherever it is desirable to transmit otherwise identical opposite rotary movement from one shaft to another. Essentially this mechanical movement is composed of a lever arm fast to each of the shafts and a link connecting the free ends of the lever arms. It is apparent, however, that a simple pivotally connected link could not be employed because with such a simple link connection there is necessarily a changing ratio between the speed of rotation of the two shafts depending upon the relative positions of the two lever arms and hence their effective leverage. To provide the result desired, the link and lever arm transmission shown in Figs. 12–16 act in conjunction with cam surfaces to obtain otherwise identical opposite rotary movement of the two shafts.

The transmission 130 forming the subject of Figs. 12–16 is shown as mounted on a casting 131 which is adapted to be secured to the underside of the corresponding side frame bar 21 of the vehicle frame 20 of the vehicle in the same manner as with the casting 82 of the gear transmission shown in Figs. 1–11. This casting 131 is shown as having an integral depending bearing block 132 carrying a pair of bearings 133 for a pair of horizontally spaced parallel stub shafts 134. A removable depending bearing block 135 is also secured to the casting 131 by screws 136 or in any other suitable manner, this removable bearing block 135 carrying a pair of bearings 137 for the opposite ends of the stub shafts 134, the extremities of which project outwardly from the removable bearing block 135. The other ends of the stub shafts 134 and the bearing block 136 are shown as housed by a sheet metal casing or cover 138 of the same general form as the casing or cover 95 in the form of the invention shown in Figs. 1–11, this casing or cover 138 having an end wall, side walls, a bottom wall and attaching flanges, the end wall being arranged along the outer face of the integral bearing block 132 and the side and bottom walls being fitted to the sides and bottom of the removable bearing block 135. As with the form of the invention shown in Figs. 1–11, the casing or cover 138 is secured by screws 139 and gaskets 140 are provided so that a body of lubricant can be retained within the space defined by this cover or casing.

The two stub shafts 134 are connected to the ovalled front ends of the torsion rods 30 and 30a by the same socket members as in the form of the invention shown in Figs. 1–11 and a description of these connections is therefore not repeated, the same reference numerals having been applied.

Figure 12:
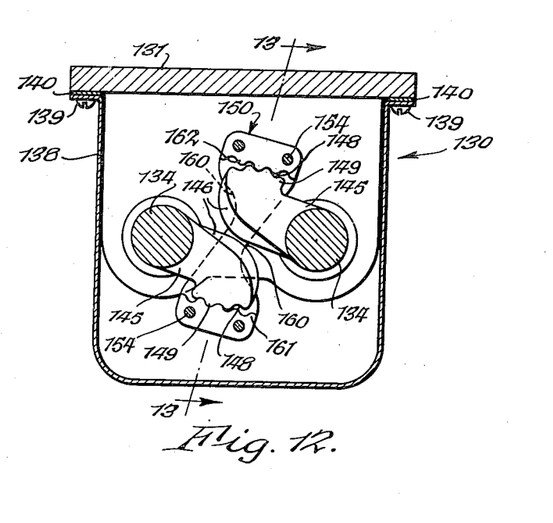
Fig. 12 is a view similar to Fig. 10 and showing a modified form of transmission for transmitting otherwise identical opposite rotary movement from one torsion rod to the other.
Figure 13:
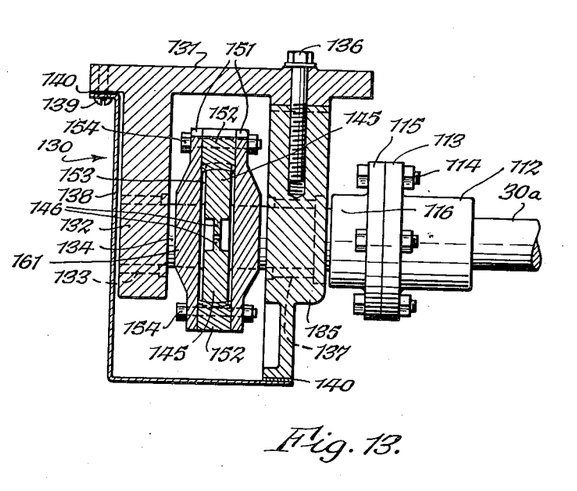
Fig. 13 is a fragmentary vertical longitudinal section, taken on line 13—13, Fig. 12.
Figure 14:
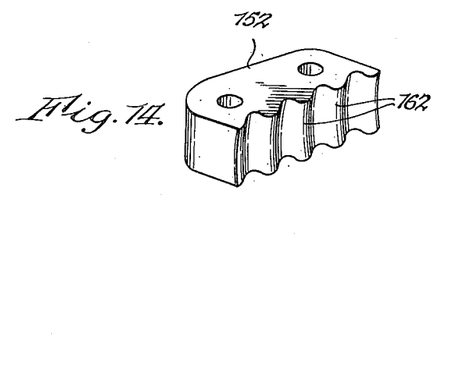
Figs. 14 and 15 are perspective views of parts composing the transmission shown in Figs. 12 and 13.
Figure 15:
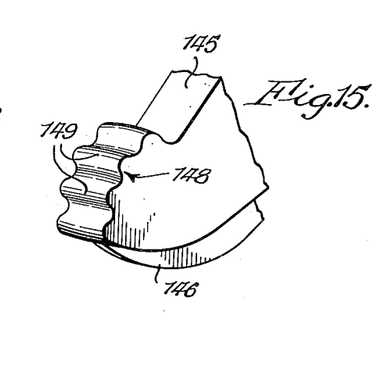

Each of the stub shafts 134 is shown as provided with an integral lever arm 145, these lever arms projecting inwardly and being normally arranged one over the other, as best shown in Fig. 12. These lever arms are shown as provided along their backs with central curved fins 146 or bumpers which extend in direct opposition to each other and are of such shape that in all positions of the lever arms 145, these fins are spaced a uniformly small distance from each other. These fins thereby prevent any substantial movement of the lever arms 145 toward each other as might otherwise occur through a backlash of one of the torsion rods. The opposite side of each lever arm 145 is formed at its extremity to provide a cam face 148, the cam face of the upper lever arm normally facing upwardly and the cam face of the lower lever arm normally facing downwardly. To prevent slippage of these cam faces on the surfaces on which they ride, these cam surfaces are preferably formed to provide a series of uniformly spaced wavy teeth 149 which extend parallel with the axes of the stub shafts 134, the effective cam faces of the lever arms thereby being the pitch line of these teeth.

The lever arms 145 are interconnected by a link, indicated generally at 150 which engages the toothed cam faces 148 of the two lever arms. This link comprises a pair of side plates 151 which embrace end blocks 152, these end blocks forming spaces between the side plates 151 and forming an open space 153 through the center of the link which receives the ends of the lever arms 145. The side plates 151 and end blocks 152 of the link are held together by a pair of bolts 154 which pass through each end of the link.

The transmission is designed for 90° of movement of the lever arm 145 and the side plates 151 are contracted at their centers and the edges of the side plates are also curved, as indicated at 160, so that in the upper extreme position of the parts these plates will partly fit around the right hand stub shaft 134, as viewed in Fig. 12, and in the lowermost position of the parts these side plates will partly fit around the left hand stub shaft 134 as viewed in this figure. As the central parts of these side plates 151 are contracted at their centers, these side plates are preferably thickened at their centers in a direction extending lengthwise of the axes of the stub shafts 145, as indicated at 161, so as to provide the necessary tensile strength.

The opposing inner surfaces of the end blocks 152 are formed to provide wavy teeth 162 which intermesh with the teeth 149 of the lever arms 145. The pitch lines of these teeth 162 are parallel to each other. Both these teeth and the teeth 149 are, however, cut so as to have a transverse curvature generated from a point between each set of teeth and the center of the link 150. By so curving the teeth, the lever arms 145 tend to maintain the link 150 in centered relation so that these lever arms remain in the center of the space 153 and do not rub against the sides 151 of the link. The sole purpose of the wavy teeth 149 and the wavy teeth 162 intermeshing therewith is to prevent the parts from slipping out of proper relation to one another and to hold the parts centered and in their essential operation the blocks 152 may therefore be regarded as having planar, parallel, opposing faces engaging true cam faces 148 on the opposing faces of the lever arms 145.

Figure 16:
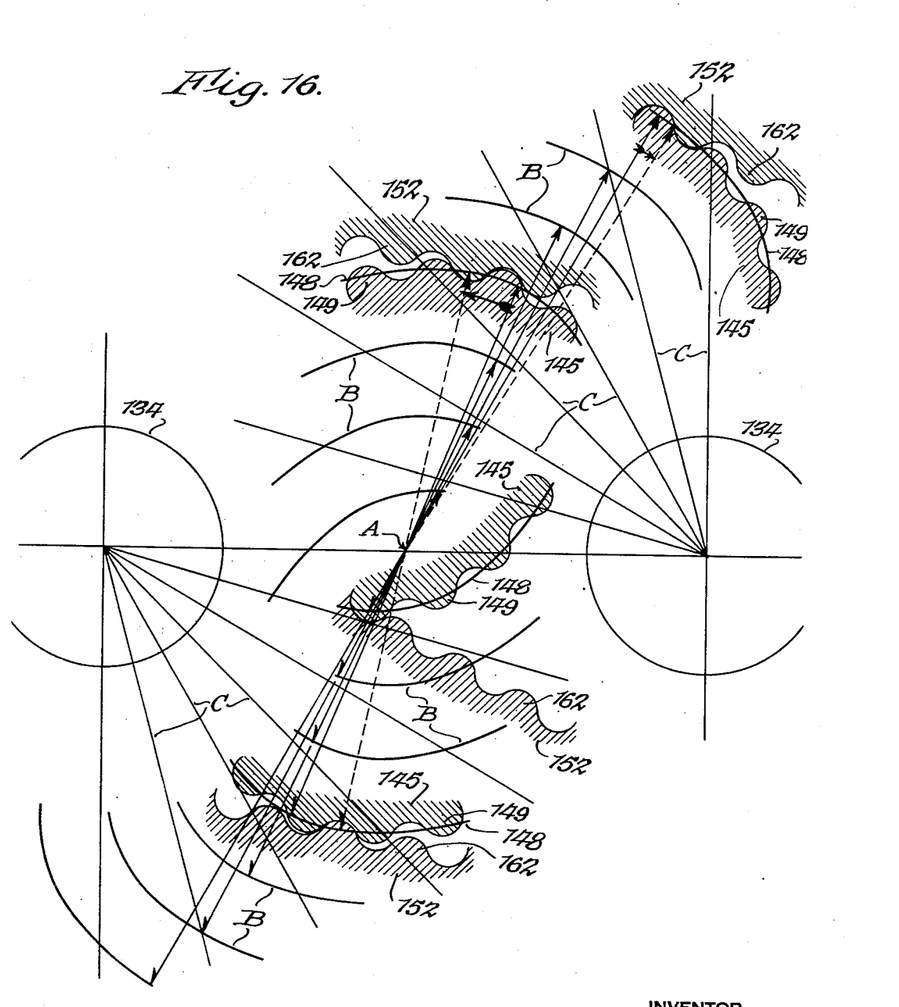
Fig. 16 is a diagrammatic view showing the manner in which the modified form of transmission illustrated in Figs. 12-15 transmits otherwise identical opposite rotary movement from one torsion rod to the other.

The precise form of the cam faces 148 (or pitch lines of the teeth 149) of the lever arms to secure identical, but opposite, movement of the two stub shafts 134 through a full 90° movement of the lever arms 145 is illustrated in Fig. 16, this figure also illustrating that true identity of movement is obtained with no acceleration or deceleration of the stub shafts relative to each other. The link 150 is necessarily of constant length but if this link were merely pivoted to the two lever arms, it will be appreciated that the effective length of the two lever arms 145 will vary, the one increasing in effective length with a decrease in the effective length of the other. To avoid this, the lever arms 145 are provided with the cam surfaces 148 which shift the link and control the effective length of the lever arms so that the line of power transmission through the link always intersects a point midway between the two stub shafts 134, this common point being designated at A in Fig. 16 and the lines of power transmission through the link being indicated by the double headed arrows passing through this point A. To secure the desired identity of movement of the two stub shafts 134 the cam faces 148 are also designed so that these lines of power transmission through the link, indicated by the double headed arrows, rotate about the point A which is midway between the two stub shafts 134. By so designing the cam faces 148 that the line of power transmission through the link rotates about the center point A, there can be no acceleration or deceleration of the drive shaft in relation to the driven shaft and also the effective leverage of the two lever arms 145 is maintained constant. As a result, with the link and lever arm power transmission illustrated in Figs. 12-16, the stub shafts 134 are compelled to rotate together in opposite directions within the assumed range of 90° without any variation, other than being opposite, in their rotation or power transmission.

In Fig. 16, the curved lines B represent the cam surfaces 148 (or the pitch lines of the wavy teeth 149) of the lever arms 145 and these lines B are placed in the different positions these cam faces or pitch lines assume as the lever arms are progressively moved at 15° intervals, represented by the radial lines C, through a full 90° arc.

The use of the wavy teeth 149 and 162 to prevent slipping of the otherwise smooth cam faces 148 of the lever arms 145 along the otherwise flat opposing parallel faces of the end blocks 152 of the link introduces another factor. The use of these teeth causes the line of power transmission (represented by the double headed arrows in Fig. 16) to shift from the position they would occupy if the faces 148 were true cams and the opposing faces of the blocks 152 true planes. Thus, the full line double headed arrows in Fig. 16 represent the line of power transmission in different positions of the parts assuming true cam and plane surfaces. The dotted line double headed arrows represent the shifting of two of the lines of power transmission due to the use of the wavy teeth on these otherwise true cam and plane surfaces. It will be noted, however, that the two dotted line arrows intersect the point A and it will therefore be seen that the application of the wavy teeth to the otherwise true cam and plane surfaces of the lever arms 145 and link 150, respectively, do not impair the efficiency of the transmission in securing identical, but opposite, rotary movement of the two stub shafts 145 in the same manner as with the pair of gears in the form of the invention illustrated in Figs. 1-11.

It will be seen that the novel form of link and lever transmission shown in Figs. 12-16 is distinctly different from the pair of gears shown in Figs. 1-11 in that with the gears, the teeth are in shear and with the link and lever transmission shown in Figs. 12-16, the teeth are merely to prevent slippage and the link is under tension at all times. The link and lever transmission shown in Figs. 12-16 is therefore particularly applicable to heavy load conditions.

From the foregoing it will be seen that the present invention provides a tandem axle spring suspension attaining the objects and having the many operating and structural advantages set forth and at the same time achieves axle compensation, that is, load transfer from one tandem axle to the other, in a simple, direct and positive manner and through a transmission which is not subject to wear or frequent service attention.

I claim as my invention:

1. A tandem axle vehicle spring suspension, comprising a frame, two axles each having wheels journaled thereon, a plurality of rotary spring means mounted on said frame and each having one end operatively connected to the corresponding end of a companion axle, said rotary spring means at each side of said vehicle being arranged to project axially in the same direction from the corresponding end of the axles and with their axes arranged adjacent and lengthwise of each other, and a transmission including a plurality of movable parts interconnecting the opposite ends of the rotary spring means at each side of the vehicle to effect a compensating load transfer from each end of each axle to the adjacent end of its companion axle when said axles are subject to different loads.

2. A tandem axle vehicle spring suspension, comprising a frame, two axles each having wheels journaled thereon, a lever fulcrumed on said frame adjacent each end of each of said axles, means pivotally connected to each of said levers and pivotally connected to the corresponding end of the companion axle, a plurality of rotary spring means mounted on said frame and each having one end operatively connected to the corresponding end of a companion lever, said rotary spring means at each side of said vehicle being arranged to project axially in the same direction from the corresponding lever with their axes arranged adjacent and lengthwise of each other, and a transmission including a plurality of movable parts interconnecting the opposite ends of the rotary spring means at each side of the vehicle to effect a corresponding load transfer from each end of each axle to the adjacent end of its companion axle when said axles are subject to different loads.

3. A tandem axle vehicle spring suspension, comprising a frame, two axles each having wheels journaled thereon, a lever fulcrumed on said frame adjacent each end of each of said axles to swing about an axis extending lengthwise of the vehicle frame and normally extending outwardly from its connection with said frame, means pivotally connected to each of said levers and pivotally connected to the corresponding end of the companion axle and permitting movement of each of said axles in a direction laterally of said frame, a plurality of rotary spring means mounted on said frame and each having one end operatively connected to the corresponding lever, said rotary spring means at each side of said vehicle being arranged to project axially in the same direction from the corresponding lever lengthwise of said frame and lengthwise of each other, and a transmission including a plurality of movable parts interconnecting the opposite ends of the rotary spring means at each side of the vehicle to effect a corresponding load transfer from each end of each axle to the adjacent end of its companion axle when said axles are subject to different loads.

4. A tandem axle vehicle spring suspension, comprising a frame, two axles each having wheels journaled thereon, a lever fulcrumed on said frame adjacent each end of each of said axles to swing about an axis extending lengthwise of the vehicle frame and normally extending outwardly from its connection with said frame, means pivotally connected to each of said levers and pivotally connected to the corresponding end of the companion axle at a point normally above said pivotal connection with said lever and permitting movement of each of said axles in a direction laterally of said frame, a plurality of rotary spring means mounted on said frame and each having one end operatively connected to the corresponding lever, said rotary spring means at each side of said vehicle being arranged to project axially in the same direction from the corresponding lever lengthwise of said frame and lengthwise of each other, and a transmission including a plurality of movable parts interconnecting the opposite ends of the rotary spring means at each side of the vehicle to effect a corresponding load transfer from each end of each axle to the adjacent end of its companion axle when said axles are subject to different loads.

5. A tandem axle vehicle spring suspension, comprising a frame, two axles each having wheels journaled thereon, a lever fulcrumed on said frame adjacent each end of each of said axles to swing about an axis extending lengthwise of the vehicle frame and normally extending outwardly from its connection with said frame, a shackle connecting the outer part of each of said levers with the corresponding end of the companion axle, each of said shackles extending upwardly and inwardly from the corresponding lever and permitting movement of each of said axles in a direction laterally of the frame, a plurality of rotary spring means mounted on said frame and each having one end operatively connected to the corresponding lever, said rotary spring means at each side of said vehicle being arranged to project axially in the same direction from the corresponding lever lengthwise of said frame and lengthwise of each other, and a transmission including a plurality of movable parts interconnecting the opposite ends of the rotary spring means at each side of the vehicle to effect a corresponding load transfer from each end of each axle to the adjacent end of its companion axle when said axles are subject to different loads.

6. A tandem axle vehicle spring suspension, comprising a frame, two axles each having wheels journaled thereon, a lever fulcrumed on said frame adjacent each end of each of said axles to swing about a generally horizontal axis extending lengthwise of the vehicle frame and said axes extending forwardly and inwardly so that the axes of the levers on opposite sides of the vehicle cross one another in advance of the tandem axle suspension, each of said levers normally extending outwardly from its connection with said frame, a shackle pivotally connected with the outer end of each of said levers and pivotally connected with the corresponding end of the companion axle, a plurality of rotary spring means mounted on said frame and each having one end operatively connected to the corresponding lever, said rotary spring means at each side of said vehicle being arranged to project forwardly from the companion lever with its axis in coaxial relation to the said horizontal axis of its companion lever and said rotary spring means at each side of said vehicle being arranged lengthwise of each other, and a transmission including a plurality of movable parts interconnecting the opposite ends of the rotary spring means at each side of the vehicle to effect a corresponding load transfer from each end of each axle to the adjacent end of its companion axle when said axles are subject to different loads.

7. A tandem axle vehicle spring suspension, comprising a frame, two axles each having wheels journaled thereon, a lever fulcrumed on said frame adjacent each end of each of said axles to swing about a generally horizontal axis extending lengthwise of the vehicle frame and said axes extending forwardly and inwardly so that the axes of the levers on opposite sides of the vehicle cross one another in advance of the tandem axle suspension, each of said levers normally extending outwardly from its connection with said frame, a shackle pivotally connected with the outer end of each of said levers and pivotally connected with the corresponding end of the companion axle, the axes of said pivotal connections for each shackle extending generally parallel with the said horizontal axis of the companion lever, a plurality of rotary spring means mounted on said frame and each having one end operatively connected to the corresponding lever, said rotary spring means at each side of said vehicle being arranged to project forwardly from the companion lever with its axis in coaxial relation to the said horizontal axis of its companion lever and said rotary spring means at each side of said vehicle being arranged lengthwise of each other, and a transmission including a plurality of movable parts interconnecting the opposite ends of the rotary spring means at each side of the vehicle to effect a corresponding load transfer from each end of each axle to the adjacent end of its companion axle when said axles are subject to different loads.

8. A tandem axle vehicle spring suspension, comprising a frame, two axles each having wheels journaled thereon, a plurality of torsion rods journaled on said frame and each having one end operatively connected to the corresponding end of a companion axle, said torsion rods at each side of said vehicle being arranged to project in the same direction from the corresponding ends of the axles and being arranged lengthwise of each other, and a transmission including a plurality of movable parts interconnecting the opposite ends of said torsion rods at each side of the vehicle to transmit opposite identical rotary movement of said opposite ends of said torsion rods and thereby effect a compensating load transfer from each end of each axle to the adjacent end of its companion axle when said axles are subject to different loads.

9. A tandem axle vehicle spring suspension, comprising a frame, two axles each having wheels journaled thereon, a lever fulcrumed on said frame adjacent each end of each of said axles to swing about an axis extending lengthwise of the vehicle frame and normally extending outward from its connection with said frame, means pivotally connected to the corresponding end of each of said levers and pivotally connected to the corresponding end of the companion axle and permitting movement of each of said axles in a direction laterally of the frame, a plurality of torsion rods mounted on said frame and each arranged substantially concentric with and connected to a corresponding lever, said torsion rods at each side of said vehicle being arranged to project axially in the same direction from the corresponding lever lengthwise of the frame and lengthwise of each other, and a transmission including a plurality of movable parts interconnecting the opposite ends of said torsion rods at each side of the vehicle to transmit opposite identical rotary movement of said opposite ends of said torsion rods and thereby effect a corresponding load transfer from each end of each axle to the adjacent end of its companion axle when said axles are subject to different loads.

10. A tandem axle vehicle spring suspension, comprising a frame, two axles each having wheels journaled thereon, a lever fulcrumed on said frame adjacent each end of each of said axles to swing about an axis extending lengthwise of the vehicle frame and normally extending outward from its connection with said frame, means pivotally connected to the corresponding end of each of said levers and pivotally connected to the corresponding end of the companion axle at a point normally above said pivotal connection with said lever and permitting movement of each of said axles in a direction laterally of the frame, a plurality of torsion rods mounted on said frame and each arranged substantially concentric with and connected to a corresponding lever, said torsion rods at each side of said vehicle being arranged to project axially in the same direction from the corresponding lever lengthwise of the frame and lengthwise of each other, and a transmission including a plurality of movable parts interconnecting the opposite ends of said torsion rods at each side of the vehicle to transmit opposite identical rotary movement of said opposite ends of said torsion rods and thereby effect a corresponding load transfer from each end of each axle to the adjacent end of its companion axle when said axles are subject to different loads.

11. A tandem axle spring suspension, comprising a frame, two axles each having wheels journaled thereon, a lever fulcrumed on said frame adjacent each end of each of said axles to swing about an axis extending lengthwise of the vehicle frame and normally extending outwardly from its connection with said frame, a shackle connecting the outer part of each of said levers with the corresponding end of the companion axle, each of said shackles extending upwardly and inwardly from the corresponding lever and permitting movement of said axles in a direction laterally of the frame, a plurality of torsion rods mounted on said frame and each arranged substantially concentric with and connected to a corresponding lever, said torsion rods at each side of said vehicle being arranged to project axially in the same direction from the corresponding lever lengthwise of the frame and lengthwise of each other, and a transmission including a plurality of movable parts interconnecting the opposite ends of said torsion rods at each side of the vehicle to transmit opposite identical rotary movement of said opposite ends of said torsion rods and thereby effect a corresponding load transfer from each end of each axle to the adjacent end of its companion axle when said axles are subject to different loads.

12. A tandem axle spring suspension, comprising a frame, two axles each having wheels journaled thereon, a lever fulcrumed on said frame adjacent each end of each of said axles to swing about a generally horizontal axis extending lengthwise of the vehicle frame and said axes being arranged to extend forwardly and inwardly so that the axes of the levers on opposite sides of the vehicle cross one another in advance of the tandem axle suspension, each of said levers normally extending outwardly from its connection with said frame, a shackle pivotally connected with the outer end of each of said levers and pivotally connected with the corresponding end of the companion axle, a plurality of torsion rods mounted on said frame and each having one end operatively connected to the corresponding lever, said torsion rods at each side of said vehicle being arranged to project forwardly from the companion lever with its axis in coaxial relation to the said horizontal axis of its companion lever and said torsion rods at each side of said vehicle being arranged lengthwise of each other, and a transmission including a plurality of movable parts interconnecting the forward ends of said torsion rods at each side of the vehicle to transmit opposite identical rotary movement of said forward ends of each pair of torsion rods and thereby effect a corresponding load transfer from each end of each axle to the adjacent end of its companion axle when said axles are subject to different loads.

13. A tandem axle vehicle spring suspension, comprising a frame, two axles each having wheels journaled thereon, a plurality of rotary spring means mounted on said frame and each having one end operatively connected to the corresponding end of a companion axle, said rotary spring means at each side of said vehicle being arranged to project axially in the same direction from the corresponding end of the axles and with their axes arranged adjacent and lengthwise of each other, a transmission including a plurality of movable parts adapted to interconnect the opposite ends of the rotary spring means at each side of the vehicle to effect a compensating load transfer from each end of each axle to the adjacent end of its companion axle when said axles are subject to different loads, means connected with each transmission for connecting said transmission to the adjacent end of one of said rotary spring means, and rotary adjustable means connected with each transmission for adjustably connecting said transmission with the adjacent end of the other of said rotary spring means, said adjustment adjusting the normal stress to which said rotary spring means are subjected.

14. A tandem axle vehicle spring suspension, comprising a frame, two axles each having wheels journaled thereon, a plurality of torsion rods journaled on said frame and each having one end operatively connected to the corresponding end of a companion axle, said torsion rods at each side of said vehicle being arranged to project in the same direction from the corresponding ends of the axles and being arranged lengthwise of each other, a transmission including a plurality of movable parts adapted to interconnect the other ends of the torsion rods at each side of the vehicle to effect a compensating load transfer from each end of each axle to the adjacent end of its companion axle when said axles are subject to different loads, means connected with each transmission for connecting said transmission to the adjacent ends of one of said torsion rods, and rotary adjustable means connected with each transmission for adjustably connecting said transmission with the adjacent end of the other of said torsion rods, said adjustment adjusting the normal stress to which said torsion rods are subjected.

15. A tandem axle vehicle spring suspension, comprising a frame, two axles each having wheels journaled thereon, a plurality of rotary spring means mounted on said frame and each having one end operatively connected to the corresponding end of a companion axle, said rotary spring means at each side of said vehicle being arranged to project axially in the same direction from the corresponding end of the axles and with their axes arranged adjacent and lengthwise of each other, and a transmission interconnecting the opposite ends of the rotary spring means at each side of the vehicle to effect a compensating load transfer from each end of each axle to the adjacent end of its companion axle when said axles are subject to different loads, each of said transmissions comprising a gear casing secured to said frame, a pair of substantially identical intermeshing gears rotatably mounted in said gear casing, means for operatively connecting one of said gears to one of said rotary spring means at the same side of said vehicle, and means for operatively connecting the other of said gears to the companion rotary spring means.

16. A tandem axle vehicle spring suspension, comprising a frame, two axles each having wheels journaled thereon, a plurality of torsion rods journaled on said frame and each having one end operatively connected to the corresponding end of a companion axle, said torsion rods at each side of said vehicle being arranged to project in the same direction from the corresponding ends of the axles and being arranged lengthwise of each other, and a transmission interconnecting the opposite ends of said torsion rods at each side of the vehicle to transmit opposite identical rotary movement of said opposite ends of said torsion rods and thereby effect a compensating load transfer from each end of each axle to the adjacent end of its companion axle when said axles are subject to different loads, each of said transmissions comprising a gear casing secured to said frame, a pair of substantially identical intermeshing gears rotatably mounted in said gear casing, means for substantially coaxially connecting one of said gears to one of said torsion rods at the same side of said vehicle, and means for substantially coaxially connecting the other of said gears to the companion torsion rod.

17. A tandem axle vehicle spring suspension, comprising a frame, two axles each having wheels journaled thereon, a plurality of rotary spring means mounted on said frame and each having one end operatively connected to the corresponding end of a companion axle, said rotary spring means at each side of said vehicle being arranged to project axially in the same direction from the corresponding end of the axles and with their axes arranged adjacent and lengthwise of each other, and a transmission interconnecting the opposite ends of the rotary spring means at each side of the vehicle to effect a compensating load transfer from each end of each axle to the adjacent end of its companion axle when said axles are subject to different loads, each of said transmissions comprising a casing secured to said frame, a pair of lever arms each having one end rotatably mounted in said casing, a link interposed between the free ends of said lever arms, the connection between each of said lever arms and said link including a cam face, said cam faces being shaped to revolve said link about a substantially constant axis arranged substantially midway between the axes of rotation of said lever arms, means for operatively connecting one of said lever arms to one of said rotary spring means at the same side of said vehicle, and means for operatively connecting the other of said lever arms to the companion rotary spring means.

18. A tandem axle vehicle spring suspension, comprising a frame, two axles each having wheels journaled thereon, a plurality of torsion rods journaled on said frame and each having one end operatively connected to the corresponding end of a companion axle, said torsion rods at each side of said vehicle being arranged to project in the same direction from the corresponding ends of the axles and being arranged lengthwise of each other, and a transmission interconnecting the opposite ends of said torsion rods at each side of the vehicle to transmit opposite identical rotary movement of said opposite ends of said torsion rods and thereby effect a compensating load transfer from each end of each axle to the adjacent end of its companion axle when said axles are subject to different loads, each of said transmissions comprising a casing secured to said frame, a pair of lever arms each having one end rotatably mounted in said casing to swing about an axis parallel with the axis of rotation of the other lever arm, a tension link embracing the free ends of said lever arms, the connection between each of said lever arms and said link including a cam face, said cam faces being shaped to revolve said link about a substantially constant axis arranged substantially midway between said parallel axes of said lever arms, means for operatively connecting one of said lever arms to one of said torsion rods at the same side of said vehicle, and means for operatively connecting the other of said lever arms to the companion torsion rod.

19. A tandem axle vehicle spring suspension, comprising a frame, two axles each having wheels journaled thereon, a plurality of torsion rods journaled on said frame and each having one end operatively connected to the corresponding end of a companion axle, said torsion rods at each side of said vehicle being arranged to project in the same direction from the corresponding ends of the axles and being arranged lengthwise of each other, and a transmission interconnecting the opposite ends of said torsion rods at each side of the vehicle to transmit opposite identical rotary movement of said opposite ends of said torsion rods and thereby effect a compensating load transfer from each end of each axle to the adjacent end of its companion axle when said axles are subject to different loads, each of said transmissions comprising a casing secured to said frame, a pair of lever arms each having one end rotatably mounted in said casing to swing about an axis parallel with the axis of rotation of the other lever arm, a tension link embracing the free ends of said lever arms, the connection between each of said lever arms and said link including a cam face, said cam faces being shaped to revolve said link about a substantially constant axis arranged substantially midway between said parallel axes of said lever arms, means for operatively connecting one of said lever arms to one of said torsion rods at the same side of said vehicle, and means for operatively connecting the other of said lever arms to the companion torsion rod, each of said cam faces being also formed to provide teeth meshing with teeth formed in its opposing face to prevent said link from slipping out of position, and each of said lever arms being also formed to provide opposing fins to prevent any substantial movement of said lever arms toward each other.

ALBERT F. HICKMAN.